UNITED STATES PATENT OFFICE 2,347,928

MONO-AZO DYESTUFFS

Gérald Bonhôte, deceased, late of Basel, Switzerland, by Marcelle Bonhôte, administratrix, Saint Blaise, Switzerland, and Ernst Alfred Henzi, Basel, Switzerland, assignors to Society of Chemical Industry in Basle, Basel, Switzerland No Drawing. Application January 16, 1942, Serial No. 427,066. In Switzerland October 17, 1940

3 Claims. (Cl. 260—198)

It has been found that new azo dyestuffs are obtained if monodiazo compounds of the diphenyl series are combined with N-acyl derivatives of 1-amino-8-hydroxynaphthalene sulfonic acids. The new dyestuffs, which are especially suitable for the dyeing of textile fibres of animal origin, such as wool or silk, yield red, violet to blue-violet shades on these fibres which are remarkable for their great tonal purity combined with excellent fastness properties.

Among the N-acyl derivatives of the 1-amino-8-hydroxynaphthalene sulfonic acids there come into question quite generally those derivatives which correspond to the general formula

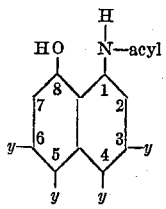

wherein at least one $y$ and not more than two $y$'s stand for $SO_3H$-groups, wherein, if only one $y$ stands for a $SO_3H$-group, this stands in one of the positions 4, 5 and 6, and wherein finally if two $y$'s stand for $SO_3H$-groups, these are separated by at least one $y$ standing for a hydrogen atom. Aminonaphthol sulfonic acids from which such compounds are obtained, are for example the 1-amino-8-hydroxynaphthalene-4-sulfonic acid, the 1-amino-8-hydroxynaphthalene-6-sulfonic acid, the 1-amino-8-hydroxynaphthalene-3:6-disulfonic acid and the 1-amino-8-hydroxynaphthalene-4:6-disulfonic acid, whereas the acyl radical may be an N-acetyl, an N-chloroacetyl, an N-carboxyethyl, an N-benzoyl, an N-chlorobenzoyl, an N-methoxybenzoyl, an N-phenoxyacetyl, an N-benzenesulfonyl, an N-para-toluenesulfonyl, and an N-para-chlorobenzene-sulfonyl or a 1- or 2-naphthalene sulfonyl radical.

Among the monodiazo compounds of the diphenyl series, the diazo compounds obtainable from the following substances may be mentioned: 2-aminodiphenyl, 4-aminodiphenyl, 4-amino-4'-acetylaminodiphenyl, 2-amino-4:4'-diacetylaminodiphenyl, 4-amino-4'-acetylaminodiphenyl, 4-amino-2':5'-dimethoxydiphenyl, 4-amino-3:2':5'-trimethoxy-6-chlorodiphenyl, 4-amino-3:3'-dimethoxy-4'-acetylaminodiphenyl.

Those dyestuffs are particularly valuable which are derived from N-acylated amino-naphthol sulfonic acids of the general formula

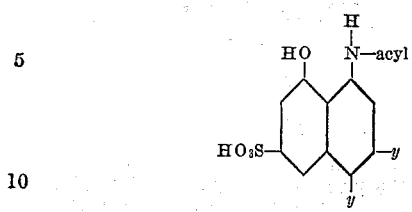

wherein one $y$ stands for a hydrogen atom and the other $y$ stands for a $SO_3H$-group; among these, especially, those which are derived from diazotizing components of the type of the 2-aminodiphenylenes. Among the latter dyestuffs those are particularly valuable in which acyl represents a $SO_2$-aryl radical, aryl standing for an aryl nucleus of the benzene series. The new dyestuffs cannot only be used for the preparation of dyeings on textiles; they may also find other applications, such as in the manufacture of colored lacquers, etc.

The following examples illustrate the invention, the parts being by weight:

Example 1

16.9 parts of 2-aminodiphenyl are diazotized with hydrochloric acid and 6.9 parts of sodium nitrite. The diazo solution thus obtained is allowed to run into a solution of 49.3 parts of 1-(4'-chloro)-benzene-sulfonylamino-8-hydroxy-3:6-naphthalene disulfonic acid, containing an excess of sodium carbonate or bicarbonate, whilst cooling and stirring. The coupling takes place quickly, and when it is complete, the dyestuff, which has partially separated, may be completely precipitated by addition of sodium chloride and filtered. The dry dyestuff which in the free form corresponds to the formula

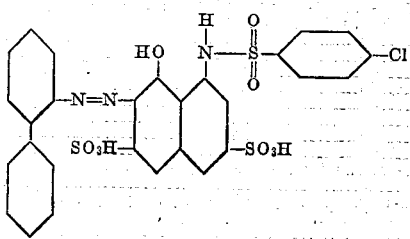

is a red powder which dissolves in concentrated sulfuric acid with a red coloration and dyes wool in very pure, bluish-red shades from acid dye-baths.

Example 2

22.6 parts of 4'-acetylamino-4-aminodiphenyl are well stirred with water and 6.9 parts of sodium nitrite, and the paste obtained is introduced, whilst cooling and stirring, into hydrochloric acid. When the diazotisation is complete, the solution of the diazo compound is allowed to run into a solution of 47.3 parts of 1-(4'-methyl)-benzene-sulfonylamino-8-hydroxy-3:6-naphthalene disulfonic acid, containing an excess of sodium carbonate, whilst stirring. The coupling commences at once, and when it is complete, the precipitated dyestuff is filtered off. After drying, the dyestuff is obtained in the form of a violet-brown powder which dissolves to a bluish-violet solution in concentrated sulfuric acid and dyes wool in pure violet shades from acid dye-baths. The new dyestuff corresponds in the free form to the formula

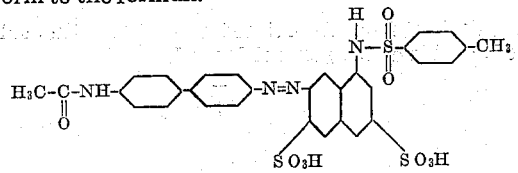

Example 3

0.2 part of the dyestuff obtained in Example 1 is dissolved in 400 parts of water, and 1 part of sodium sulfate cryst. is added to this solution. 10 parts of wool are entered into the dye-bath thus obtained. 0.4 part of concentrated formic acid is added to the bath, which is then raised to the boiling point, and dyeing is carried out for 1 hour at 95–100° C. After rinsing and drying, an extraordinary pure bluish-red dyeing is obtained.

The following table indicates the shades which may be dyed upon wool by means of the dyestuffs of the present application:

Dyestuff No. 4 of the above table corresponds in the free form to the formula

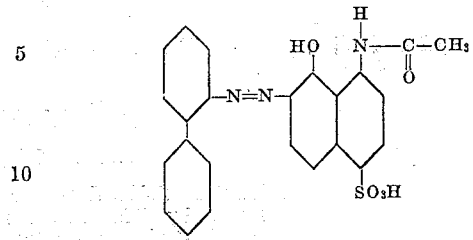

Dyestuff No. 12 of the above table corresponds in the free form to the formula

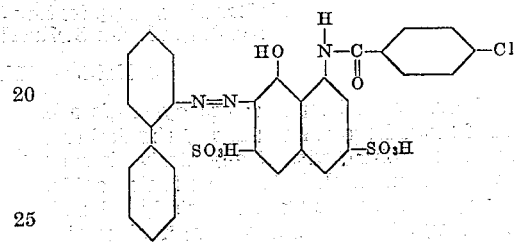

Dyestuff No. 14 of the above table corresponds in the free form to the formula

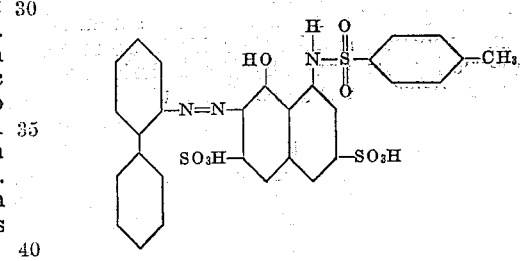

| No. | Azo component | Diazo component | Shade |
|---|---|---|---|
| 1 | 1-acetylamino-8-hydroxynaphthalene-3:6-disulfonic acid | 4-aminodiphenyl | Bluish red. |
| 2 | do | 2-aminodiphenyl | Do. |
| 3 | do | 4-amino-2':5'-dimethoxy-diphenyl | Violet. |
| 4 | 1-acetylamino-8-hydroxynaphthalene-4-sulfonic acid | 2-aminodiphenyl | Bluish red. |
| 5 | 1-acetylamino-8-hydroxynaphthalene-3:6-disulfonic acid | 4-aminodiphenyl | Do. |
| 6 | do | 2-aminodiphenyl | Do. |
| 7 | do | 4-amino-2':5'-dimethoxy-diphenyl | Violet. |
| 8 | do | 4-acetylamino-4'-aminodiphenyl | Do. |
| 9 | do | 4:4'-diacetylamino-2-aminodiphenyl | Bluish red. |
| 10 | do | 4-amino-4'-oxalylaminodiphenyl | Bluish Bordeaux. |
| 11 | chloroacetylamino-8-hydroxynaphthalene-3:6-disulfonic acid | 2-aminodiphenyl | Bluish red. |
| 12 | 1-(4'-chloro)-benzoylamino-8-hydroxynaphthalene-4:6-disulfonic acid | do | Do. |
| 13 | 1-(4'-methyl)-benzene-sulfonylamino-8-hydroxynaphthalene-3:6-disulfonic acid | do | Do. |
| 14 | do | 4-aminodiphenyl | Do. |
| 15 | do | 2-amino-2':5'-dimethoxy-diphenyl | Violet. |
| 16 | do | 4-amino-4'-acetylaminodiphenyl | Do. |
| 17 | do | 4-amino-3:2':5'-trimethoxy-6-chlorodiphenyl | Do. |
| 18 | do | 4:4'-diacetylamino-2-aminodiphenyl | Bluish red. |
| 19 | do | 4-amino-4'-oxalylaminodiphenyl | Bluish Bordeaux. |
| 20 | do | 4-amino-4'-oxalylamino-3:3'-dimethoxydiphenyl | Violet. |
| 21 | 1:1'-naphthalenesulfonylamino-8-hydroxynaphthalene-3:6-disulfonic acid | 2-aminodiphenyl | Bluish red. |
| 22 | 1-(4'-chloro)-benzene-sulfonylamino-8-hydroxynaphthalene-3:6-disulfonic acid | do | Do. |
| 23 | do | 4-aminodiphenyl | Do. |
| 24 | do | 4-amino-2':5'-dimethoxydiphenyl | Violet. |
| 25 | do | 4-amino-3:2':5'-trimethoxy-6-chlorodiphenyl | Do. |
| 26 | do | 4:4'-diacetylamino-2-aminodiphenyl | Bluish red. |
| 27 | do | 4-amino-4'-oxalylamino-diphenyl | Bluish Bordeaux. |
| 28 | do | 4-amino-4'-oxalylamino-3:3'-dimethoxydiphenyl | Violet. |
| 29 | do | 4-amino-4'-acetylamino-diphenyl | Do. |
| 30 | do | 4-amino-2-nitro-4'-acetylaminodiphenyl | Red. |
| 31 | 1-acetylamino-8-hydroxynaphthalene-4:6-disulfonic acid | 2-aminodiphenyl | Bluish red. |
| 32 | do | 4-aminodiphenyl | Do. |
| 33 | 1-benzenesulfonylamino-8-hydroxynaphthalene-3:6-disulfonic acid | 2-aminodiphenyl | Do. |
| 34 | do | 4-amino-4'-acetylaminodiphenyl | Violet. |
| 35 | 1-benzoylamino-8-hydroxynaphthalene-3:6-disulfonic acid | 2-aminodiphenyl | Bluish red. |
| 36 | do | 4-aminodiphenyl | Bordeaux. |
| 37 | do | 4-amino-4'-acetylaminodiphenyl | Violet. |
| 38 | 1-benzoylamino-8-hydroxynaphthalene-4:6-disulfonic acid | 2-aminodiphenyl | Bluish red. |
| 39 | do | 4-aminodiphenyl | Reddish Bordeaux. |
| 40 | do | 4-amino-4'-acetylaminodiphenyl | Reddish violet. |

Dyestuff No. 25 of the above table corresponds in the free form to the formula

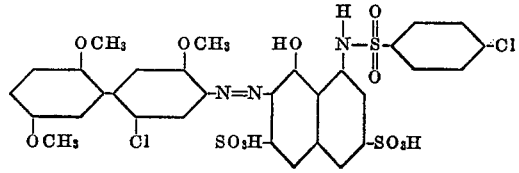

Dyestuff No. 35 of the above table corresponds in the free form to the formula

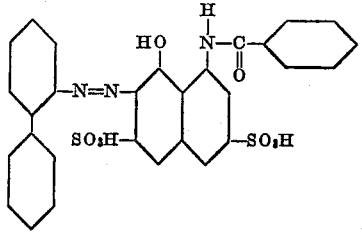

Dyestuff No. 38 of the above table corresponds in the free form to the formula

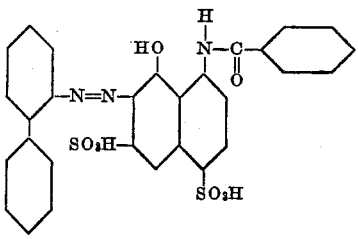

What we claim is:
1. The monoazo-dyestuffs corresponding in the free form to the general formula

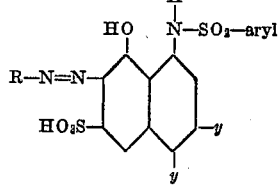

wherein aryl stands for a nucleus of the benzene series, R stands for a diphenyl radical connected to the azo group at a position ortho to the diphenyl linkage, and wherein one $y$ stands for an $SO_3H$-group and the other $y$ stands for a hydrogen atom.

2. The monoazo-dyestuffs corresponding in the free form to the general formula

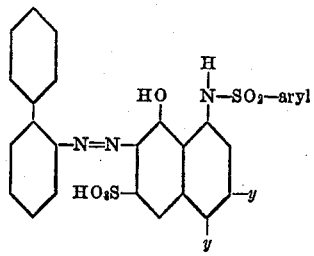

wherein aryl stands for a nucleus of the benzene series, and wherein one $y$ stands for an $SO_3H$-group and the other $y$ stands for a hydrogen atom.

3. The monoazo-dyestuff corresponding in the free form to the formula

MARCELLE BONHÔTE,
*Administratrix of the Estate of Gérald Bonhôte, Deceased.*
ERNST ALFRED HENZI.